United States Patent
Lagares-Greenblatt et al.

(10) Patent No.: US 10,938,881 B2
(45) Date of Patent: Mar. 2, 2021

(54) DATA ENGAGEMENT FOR ONLINE CONTENT AND SOCIAL NETWORKS

(71) Applicant: International Business Machines Corporation, Armonk, NY (US)

(72) Inventors: Heidi Lagares-Greenblatt, Jefferson Hills, PA (US); Justin McCoy, Austin, TX (US); Jessica Doherty, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 15/825,391

(22) Filed: Nov. 29, 2017

(65) Prior Publication Data
US 2019/0166184 A1    May 30, 2019

(51) Int. Cl.
*H04L 29/08* (2006.01)
*G06Q 50/00* (2012.01)
*G06F 40/30* (2020.01)

(52) U.S. Cl.
CPC ............ *H04L 67/025* (2013.01); *G06F 40/30* (2020.01); *G06Q 50/01* (2013.01); *H04L 67/22* (2013.01); *H04L 67/306* (2013.01); *H04L 29/08* (2013.01)

(58) Field of Classification Search
None
See application file for complete search history.

(56) References Cited

U.S. PATENT DOCUMENTS

| 8,676,937 | B2 | 3/2014 | Rapaport et al. |
| 9,256,826 | B2 | 2/2016 | Srinivasan et al. |
| 9,471,687 | B2 | 10/2016 | Ahmed et al. |
| 10,360,227 | B2* | 7/2019 | Garg ............. G06F 16/285 |
| 2007/0214097 | A1 | 9/2007 | Parsons et al. |
| 2011/0113094 | A1 | 5/2011 | Chunilal |
| 2011/0302103 | A1 | 12/2011 | Carmel et al. |
| 2014/0067782 | A1* | 3/2014 | Waupotitsch ......... G06F 16/951 707/706 |
| 2014/0089816 | A1* | 3/2014 | DiPersia ............... G06F 3/0484 715/753 |

(Continued)

OTHER PUBLICATIONS

Indeed, "Social Media Engagement Jobs," printed Jul. 10, 2017, 2 pages http://www.indeed.com/g-Social-Media-Engagement-jobs.html.

(Continued)

*Primary Examiner* — James A Edwards
(74) *Attorney, Agent, or Firm* — Peter Edwards (57) ABSTRACT

A method, system, and computer program product for providing a dynamic estimation on engagements and patterns of content includes: receiving a data packet from an input field of a form on a computing device; analyzing historical data associated with a user to identify patterns between the first string of characters and the historical data; determining one or more related strings of characters from the historical data based on the identified patterns; determining a historic engagement level for each of the one or more related strings of characters; determining a predicted engagement level for the string of characters based on the historic engagement level; and transmitting at least the predicted engagement level to the computing device to cause the computing device to display the predicted engagement level in a selectable field associated with the input field.

17 Claims, 4 Drawing Sheets

(56) References Cited

U.S. PATENT DOCUMENTS

| | | | |
|---|---|---|---|
| 2014/0122622 A1* | 5/2014 | Castera | H04L 51/04 |
| | | | 709/206 |
| 2014/0229679 A1 | 8/2014 | Santhanam et al. | |
| 2015/0100377 A1* | 4/2015 | Penumaka | G06Q 50/01 |
| | | | 705/7.29 |
| 2015/0170294 A1 | 6/2015 | Goyal et al. | |
| 2016/0147760 A1* | 5/2016 | N | G06Q 50/01 |
| | | | 707/751 |
| 2016/0210290 A1 | 7/2016 | Booth et al. | |
| 2016/0292148 A1* | 10/2016 | Aley | G06F 17/276 |
| 2018/0285818 A1* | 10/2018 | Soltani | G06Q 10/101 |

OTHER PUBLICATIONS

Instagram, "Instagram for Business: 30 Tips to Grow Your Audience and Stand Out on Instagram," printed Jul. 10, 2017, last updated Oct. 4, 2016, 28 pages, https://blog.bufferapp.com/instagram-for-business-tips.

Patel, "10 Twitter Tactics to Increase Your Engagement: Social Media Examiner," printed Jul. 10, 2017, 9 pages http://www.socialmediaexaminer.com/twitter-tactics-to-increase-engagement.

Patel, "6 Tips That Will Drastically Improve Your Twitter Conversions," printed Jul. 10, 2017, 13 pages https://blog.crazyegg.com/2016/04/19/improve-your-twitter-conversions.

Unknown, "30+ Ultimate Headline Formulas for Tweets, Posts, Articles, and Emails," printed Jul. 10, 2017, 20 pages, https://blog.bufferapp.com/headline-formulas.

* cited by examiner

DATA ENGAGEMENT FOR ONLINE CONTENT AND SOCIAL NETWORKS

BACKGROUND

The present disclosure relates to computer networking, and more specifically to providing a dynamic estimation on engagements and patterns of content.

Social media technologies facilitate the sharing of information through networks. Users may generate various content, such as text and/or photo posts, and may interact with other users through this content. Further, social networks may be created by connecting a user profile of a user with profiles of the other users. The users may access social media technologies through a variety of methods such as applications on a mobile device, websites on a computer, etc.

SUMMARY

The present invention provides a computer-implemented method, system, and computer program product to provide a dynamic estimation on engagements and patterns of content. The method may include receiving a data packet from an input field of a form on a computing device, the data packet including a string of characters. The method may further include analyzing historical data associated with a user to identify patterns between the first string of characters and the historical data, the historical data including strings of characters previously received from the user. The method may further include determining one or more related strings of characters from the historical data based on the identified patterns. The method may further include determining a historic engagement level for each of the one or more related strings of characters, the historic engagement level indicating past interests of other users in each of the one or more related strings of characters. The method may further include determining a predicted engagement level for the string of characters based on the historic engagement level, the predicted engagement level indicating predicted surrounding user interest. The method may further include transmitting at least the predicted engagement level to the computing device to cause the computing device to display the predicted engagement level in a selectable field associated with the input field.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to data content, and more specifically to providing a dynamic estimation on engagements and patterns of content. While the present disclosure is not necessarily limited to such applications, various aspects of the disclosure may be appreciated through a discussion of various examples using this context.

Social media has large quantities of data that may be difficult to manage and organize. Over time, users of social media may share similar or the same content over social media. Further, users of social media may want to optimize popularity, or engagement, of their posts made over social media.

The present disclosure provides a computer-implemented method, system, and computer program product to provide a dynamic estimation and recommendation of engagement trends, and predicted engagement, about data or information to be shared through social media. These recommendations may be based on content and/or location comparison with previous data or information shared by a user or similar users. The data to be shared may be compared to previous data posted to recognize any patterns of similarity. The comparisons may be done at an individual user level, at a friends or contacts of the user level, and/or at a network level. If the previous data has similar content (e.g., similar subjects, ideas, topics, etc.) the engagement, or popularity, of the previous data may be shared with the user through the system. Recommendations about pattern variations of the previous data to improve the engagement level, or pattern variations of the previous data to decrease the engagement level, may be shared with the user through the system. The system may further provide links to the previous data. Location, tags, themes, titles, topics, images, etc. may all be used to give a better estimate and recommendation of the engagements.

Figure 1:
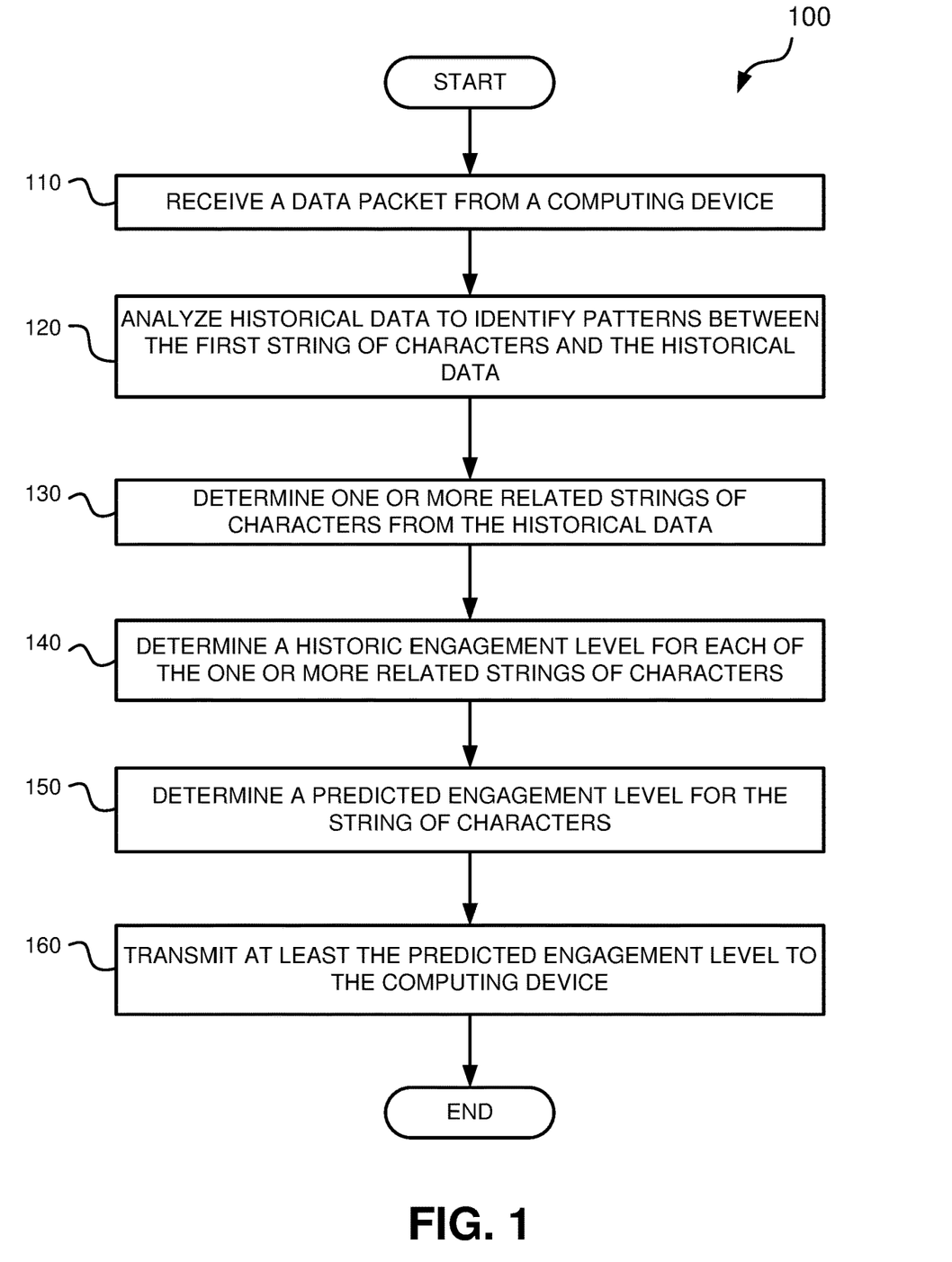
FIG. 1 depicts a flowchart of a set of operations for determining engagements and patterns of content, according to various embodiments.
Figure 4:
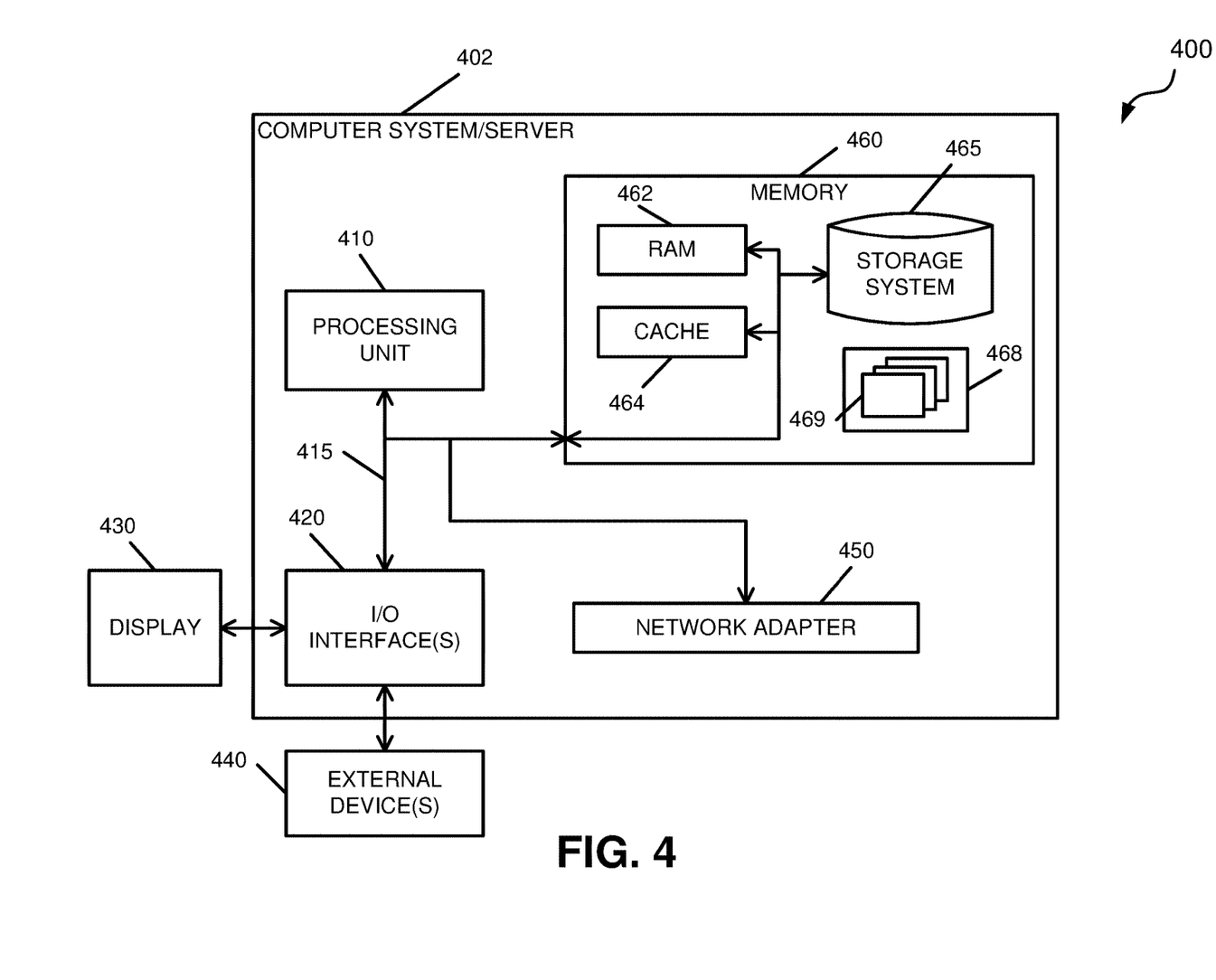
FIG. 4 depicts a block diagram of a sample computer system for implementing operations for determining engagements and patterns of content, according to various embodiments.

Referring now to FIG. 1, a flowchart illustrating a method 100 for determining engagements and patterns of content is depicted, according to various embodiments. In an embodiment, the method 100 is implemented as a computer script or computer program (e.g., computer executable code) to be executed by a server, such as server 220 (FIG. 2), on, or connected to, a computer system, such as computer system 200 (FIG. 2) or computer system 400 (FIG. 4). In various embodiments, the server is a computer device, such as computer system/server 402. In some embodiments, the server is a computer program or computer script.

Figure 2:
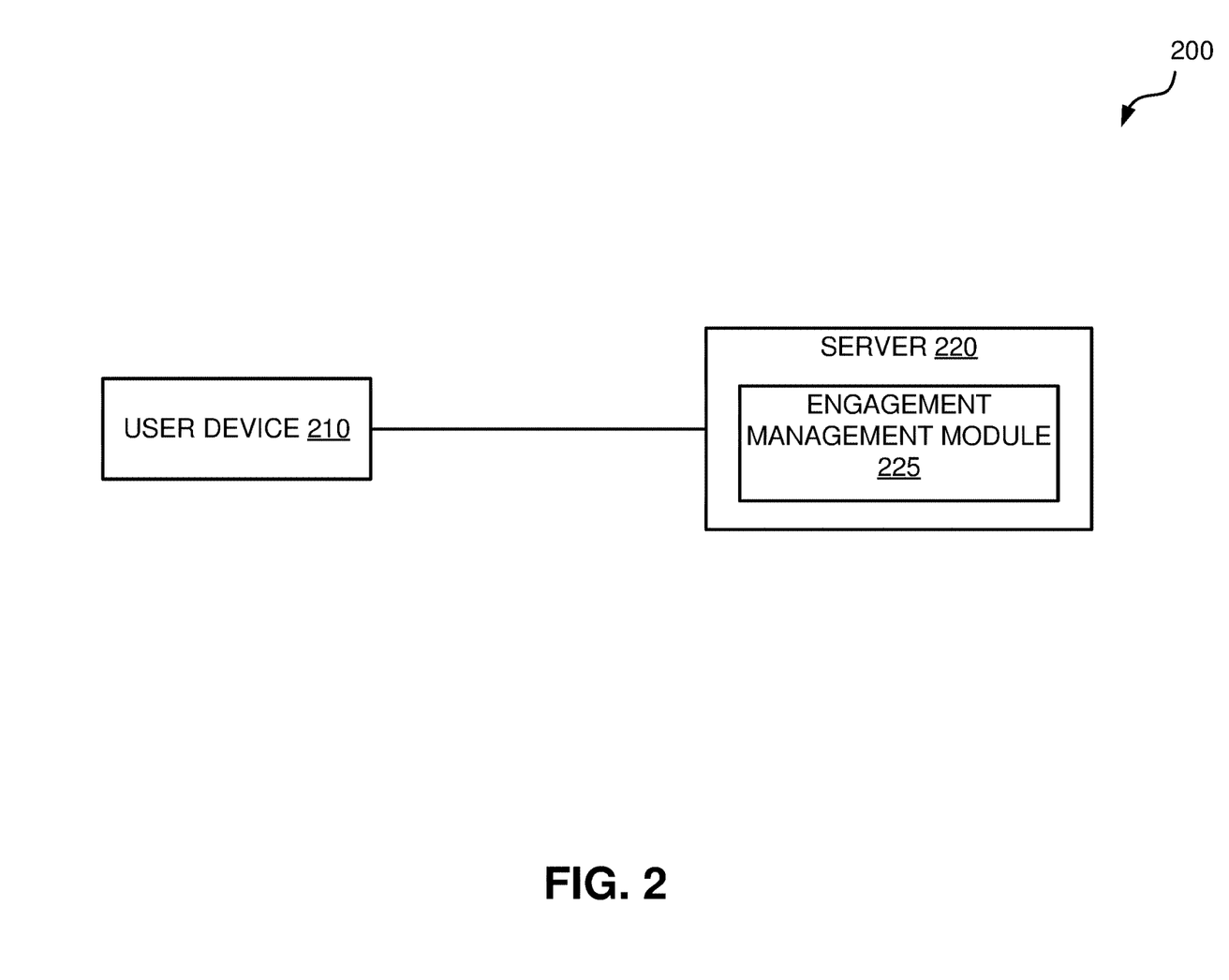
FIG. 2 depicts a block diagram of an example computer system for determining engagements and patterns of content, according to various embodiments.

In various embodiments, a server is configured to execute operation 110 to receive a data packet from a computing device. The data packet may include a string of characters. In some embodiments, the data packet is received by a user device, such as user device 210 (FIG. 2). The data packet and/or the string of characters may be a potential post on a social media platform by a user of the user device 210. In various embodiments, the potential post has not been submitted by the user. For example, the user may have written (e.g., typed, etc.) their potential post, and then the user device may transmit the potential post as a string of characters to the server. In some embodiments, the data packet (e.g., potential post) is transmitted automatically to the server. In other embodiments, the data packet is transmitted in response to user indication or selection (e.g., user selects or clicks a button or image). In some embodiments, receiving the data packets may include automatically executing one or more logical operations extracting the string of characters from a data structure within the data packet.

In some embodiments, the data packet is analyzed by processing and sorting (e.g., breaking down) the data packet and/or the string of characters into features using natural language processing. This may be done using text analysis (e.g., IBM Watson® Natural Language Understanding). The features may identify context of the data packet. Examples of features may include people, places, things, concepts, keywords, sentiment, etc. People may include people mentioned or tagged in the data packet, people who posted the data packet, and/or other people related to the data packet. Places may include locations or places mentioned or tagged in the data packet, locations where the data packet was posted (e.g., from location identifiers), and/or other locations or places related to the data packet. Features may include time of posting, associated media types, keywords, categorization, individuals identified in the media, etc.

In various embodiments, a server is configured to execute operation 120 to analyze historical data to identify patterns between the first string of characters and the historical data. The historical data may include historical data packets previously received from the user. The data packets may include one or more strings of characters. In some embodiments, the historical data includes historical data packets and/or strings of characters previously posted by other users (e.g., friends or contacts of the user). The historical data may further include data packets and/or strings of characters previously posted by users of the network (e.g., social media network). In some embodiments, analyzing the historical data includes scanning and searching for patterns between the data packet and the historical data. Analyzing the historical data may include analyzing historical data of the other users or users of the network. Analyzing the historical data may include analyzing semantic and syntactic content, location, date, time, and user tags of the previously received strings of characters uploaded by the user, other users, or uploaded through the network. Location, tags, themes, topic, titles, etc. may be used to narrow the scanning searches, thus narrowing the search and making it easier to identify the patterns. In some embodiments, the user device may display an icon, such as a moving icon, to show that the server is searching for the identified patterns.

In some embodiments, analyzing historical data includes processing and sorting (e.g., breaking down) the historical data packets from the historical data into features (i.e., historical features) using natural language processing. This may be done using text analysis (e.g., IBM Watson® Natural Language Understanding). The features may identify context of the historical data packets. Examples of features may include people, places, things, concepts, keywords, sentiment, etc. People may include people mentioned or tagged in the historical data packets, people who posted the historical data packets, and/or other people related to the historical data packets. Places may include locations or places mentioned or tagged in the historical data packets, locations where the historical data packets were posted (e.g., from location identifiers), and/or other locations or places related to the historical data packets. Features may include time of posting, associated media types, keywords, categorization, individuals identified in the media, etc. The historical features may be analyzed or compared to the features of the data packet to identify same and/or similar features. These same and/or similar features may be the patterns between the data packet and the historical data.

In various embodiments, a server is configured to execute operation 130 to determine one or more related strings of characters from the historical data. Determining the related strings of characters from the historical data may be based on the identified patterns. In some embodiments, the historical data with the highest number of patterns are the related strings of characters. In other embodiments, historical data with a number of patterns greater than or equal to a threshold number of patterns are the related strings of characters.

In various embodiments, a server is configured to execute operation 140 to determine a historic engagement level for each of the one or more related strings of characters. The historic engagement level may indicate past interests of other users in each of the one or more related strings of characters. In some embodiments, an engagement level is an amount of interest, such as likes or comments, in each related string of characters (e.g., related social media posts). Determining a historic engagement level may include analyzing and scanning each related string of characters to identify engagement.

In some embodiments, determining the historic engagement level includes calculating an engagement level from one or more historic features and/or a subset of one or more historic features. The one or more historic features may include an amount or quantity of users who have viewed the one or more related strings of characters, an amount or quantity of users who have interacted (e.g., expanding content, clicking or selecting content, etc.) with the one or more related strings of characters, a quantity of users who have reacted to the one or more related strings of characters (e.g., liked, loved, shared, disliked, etc.), an amount or quantity of users who have responded to the one or more strings of characters (e.g., submitted a string of characters in response to the one or more related strings of characters), or any additional interaction mechanisms. One or more historic features may be assigned a weight (e.g., weighting value) that is incorporated into the calculation. In some embodiments, the weight is selected by a user based on features that are determined relevant by the user. Features that are more relevant to the engagement level may be given a higher weight than features that are less relevant.

In various embodiments, a server is configured to execute operation 150 to determine a predicted engagement level for the string of characters based on the historic engagement level. The predicted engagement level may indicate a predicted surrounding user interest. In some embodiments, determining a predicted engagement level includes calculating an average engagement level from each historic engagement level, where the average engagement level is the predicted engagement level. In other embodiments, the predicted engagement level is determined using a mathematical algorithm.

Figure 3:
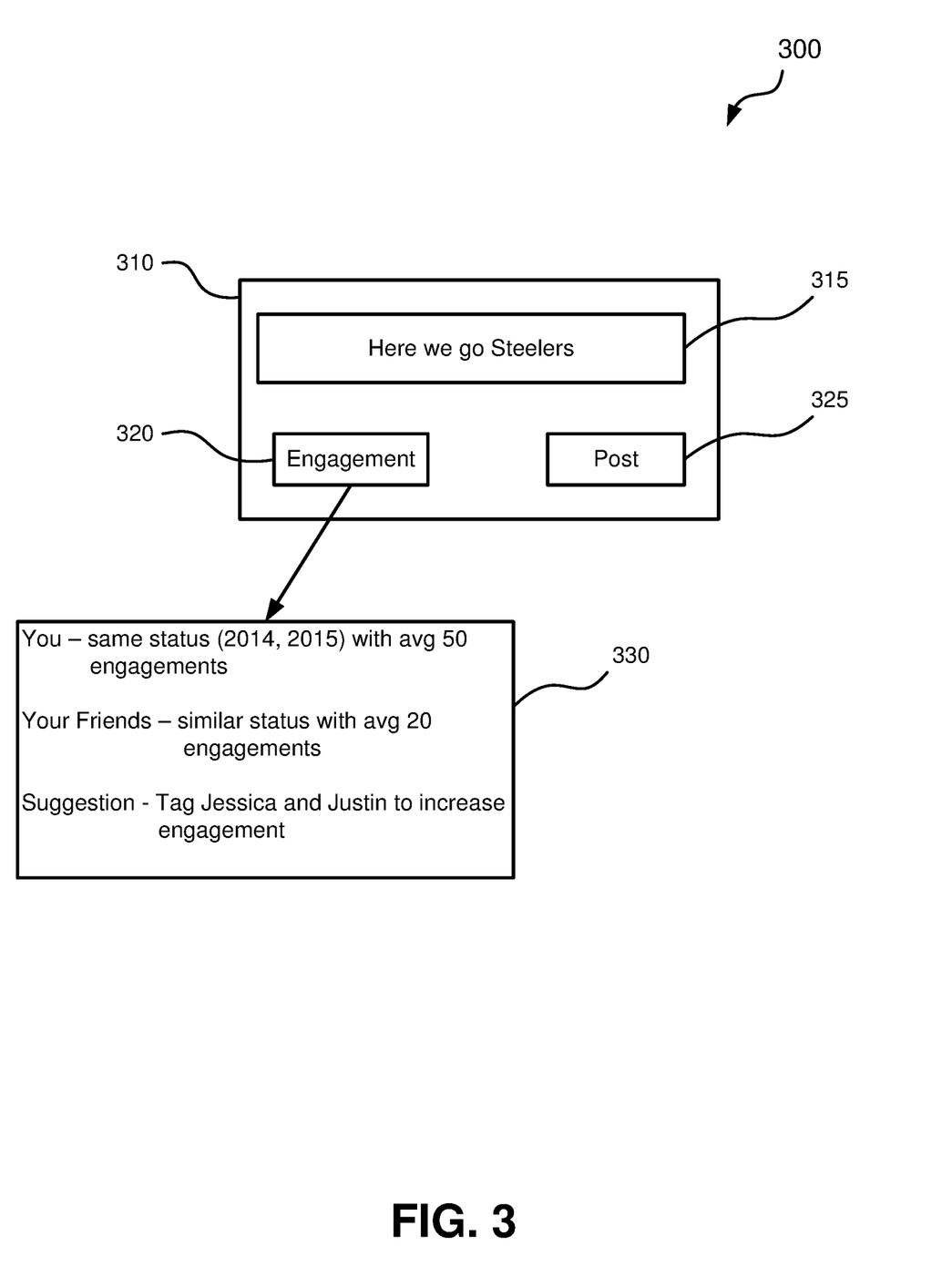
FIG. 3 depicts a schematic diagram of a sample visual representation of engagements and patterns of content, according to various embodiments.

In various embodiments, a server is configured to execute operation 160 to transmit at least the predicted engagement level to the computing device. This may cause the computing device (e.g., a user device such as user device 210 (FIG. 2)) to display the predicted engagement level in a selectable field associated with the input field. The predicted engagement level may be displayed in a field such as display field 330 (FIG. 3). In some embodiments, the selectable field may further include the historic engagement level for each of the related strings of characters. The historic engagement levels may be transmitted to the computing device to cause the computing device to display the historic engagement levels.

In various embodiments, method 100 further includes analyzing the historic engagement level and the predicted engagement level to determine whether the predicted engagement level is greater than or equal to the historic engagement level. In some embodiments, after it is determined that the predicted engagement level is greater than or equal to the past engagement level, the predicted engagement level is transmitted to the computing device. In other embodiments, after determining that the predicted engagement level is not greater than or equal to the historic engagement level, the one or more related strings of characters are analyzed to identify engagement factors, where engagement factors are patterns or factors that may have impacted the engagement level. Analyzing the related strings of characters to identify engagement factors may include analyzing the strings of characters to look for, or determine, patterns that may have impacted the high level of engagement. The analyzing may be done using techniques such as k-means clustering for cluster analysis in data mining to look for common themes.

In various embodiments, an engagement recommendation is generated based on the engagement factors. The engagement recommendation may include suggested engagement factors from the identified engagement factors to increase the predicted engagement level. The engagement recommendation may be transmitted to the computing device, causing the computing device to display the engagement recommendation. In some embodiments, the engagement recommendation is displayed in the selectable field associated with the input field.

The engagement recommendation may be determined using a model trained using a clustering algorithm (e.g., k-means clustering). The model may identify features that are found in historical data, or strings of characters, that have high historic engagement levels. A prediction model may be trained using a regression algorithm (e.g., random forest classifier) to estimate a probability of the data packet having a high engagement level based on discretizing the continuous values of an engagement level (e.g., discretizing values of 1-100 into groups of very low engagement, low engagement, medium engagement, high engagement, and very high engagement). If the data packet is identified as having a low engagement or low engagement level, the model using the clustering algorithm (i.e., clustering model) may identify historical data with similar features but a high historic engagement level. The identified historical data may be used to provide suggestions, or generate recommendations, using the historical features of the identified historical data. In some embodiments, a classification method (e.g., adaptive nearest neighbor classification) may be used to generate the recommendations. The classification method may use a linear analysis to compute surrounding areas and decision boundaries. For example, the data packet may be identified as having a low engagement level. Historical data with similar features and high engagement levels may be identified and then analyzed to determine historical features that are close (e.g., within a decision boundary) to the feature, or feature dimension, of the data packet. In some embodiments, the classification method is configured using a diagram with a rectangle representing the feature dimension of the data packet and a circle representing decision boundaries.

In various embodiments, method 100 further includes analyzing the one or more related strings of characters to identify hindrance factors. Hindrance factors may be factors that hindered, or negatively affected, historic engagement levels. In some embodiments, analyzing the one or more related strings of characters to identify hindrance factors may be in response to determining the predicted engagement level is greater than or equal to the historic engagement level. An engagement recommendation may be generated based on the hindrance factors, in some embodiments. In various embodiments, the engagement recommendation includes suggested hindrance factors from the identified hindrance factors to withhold in order to increase the predicted engagement level. The engagement recommendation may be transmitted to the computing device, causing the computing device to display the engagement recommendation. In some embodiments, the engagement recommendation is displayed in the selectable field associated with the input field.

In various embodiments, the data packet further includes an image (e.g., picture, video, graphics interchange format (GIF), etc.). In this embodiment, method 100 may further include analyzing historical images associated with the user to identify patterns between the first image and the historical images. This may be done using the same techniques discussed herein to identify patterns between the first string of characters and the historical data. When the data packet includes an image, examples of features may include colors in an image, objects in an image, people or animals in an image, or other classifications related to an image. In some embodiments, one or more related images may be determined from the historical images based on the identified patterns. A historic engagement level may be determined for each of the one or more related images. In various embodiments, the predicted engagement level for the image is determined based on the historic engagement level. The predicted engagement level may be transmitted to the computing device causing the computing device to display the predicted engagement level in the selectable field.

Referring to FIG. 2, a block diagram of an example computer system 200 for determining engagements and patterns of content is depicted, according to various embodiments. System 200 is one possible computer system capable of determining engagements and patterns of content, and is illustrated for example purposes.

In various embodiments, system 200 includes a user device 210 and a server 220. In some embodiments, the user device 210 communicates with the server 220 via any suitable network (e.g., local area network, wide area network, etc.). User device 210 may be any device such as a personal computer, laptop, smartphone, tablet, etc. In some embodiments, the server 220 includes an engagement management module 225. In various embodiments, the engagement management module 225 executes the operations 110-160, discussed herein and depicted in FIG. 1.

Referring to FIG. 3, a schematic diagram of a sample visual representation 300 of engagements and patterns of content is depicted, according to various embodiments. Visual representation 300 is one possible visual representation of engagements and patterns of content, and is illustrated for example purposes.

Visual representation 300 may include display field 310. Display field 310 may include input field 315, as well as selectable buttons 320 and 325. The input field 315, as depicted, includes a user post "Here we go Steelers." This user post may be transmitted to a computer device or a server, such as server (220), as a string of characters. In some embodiments, input field 315 may include an image. Selectable button 325 may be a button selected by a user in order to submit the user post and display the post over social media. In various embodiments, method 100 (FIG. 1) is executed prior to the user selecting button 325. Selectable button 320 may be a button selected by a user in order to transmit the user post in input field 315 to a computer device or server. In other embodiments, the user post is transmitted automatically. Once the post is transmitted, and method 100 (FIG. 1) is executed, a device, such as user device 210 (FIG. 2), may display a selectable field 330 associated with the input field 315. In some embodiments, the selectable field includes a predicted engagement level and/or historic engagement levels. Selectable field 330 includes predicted engagement level "avg 50 engagements" where the predicted engagement level is an average of historic engagement levels. The selectable field 330 further includes historic engagement levels for other users "similar status with avg 20 engagements." In some embodiments, selectable field 330 may further include an engagement recommendation to "tag Jessica and Justin to increase engagement."

Referring to FIG. 4, computer system 400 is a computer system/server 402 is shown in the form of a general-purpose computing device, according to various embodiments. The components of computer system/server 402 may include, but are not limited to, one or more processors or processing units 410, a system memory 460, and a bus 415 that couple various system components including system memory 460 to processor 410.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 460 can include computer system readable media in the form of volatile memory, such as random access memory (RAM) 462 and/or cache memory 464. Computer system/server 402 may further include other removable/non-removable, volatile/non-volatile computer system storage media. By way of example only, storage system 465 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 460 may include at least one program product having a set (e.g., at least one) of program modules that are configured to carry out the functions of embodiments of the invention.

Program/utility 468, having a set (at least one) of program modules 469, may be stored in memory 460 by way of example, and not limitation, as well as an operating system, one or more application programs, other program modules, and program data. Each of the operating system, one or more application programs, other program modules, and program data or some combination thereof, may include an implementation of a networking environment. Program modules 469 generally carry out the functions and/or methodologies of embodiments of the invention as described herein.

Computer system/server 402 may also communicate with one or more external devices 440 such as a keyboard, a pointing device, a display 430, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 420. Still yet, computer system/server 402 can communicate with one or more networks such as a local area network (LAN), a general wide area network (WAN), and/or a public network (e.g., the Internet) via network adapter 450. As depicted, network adapter 450 communicates with the other components of computer system/server 402 via bus 415. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a data packet from an input field of a form on a computing device, the data packet comprising a string of characters;
analyzing historical data associated with a user to identify patterns between the string of characters and the historical data, the historical data including at least first strings of characters previously received from the user and second strings of characters previously posted by other users;
determining one or more related strings of characters from the historical data based on the identified patterns;
determining a historic engagement level for each of the one or more related strings of characters, the historic engagement level indicating past interests of other users in each of the one or more related strings of characters;
determining a predicted engagement level for the string of characters based on the historic engagement level, the predicted engagement level indicating a predicted user interest;
analyzing the historic engagement level and the predicted engagement level to determine whether the predicted engagement level is greater than or equal to the historic engagement level;
in response to determining the predicted engagement level is not greater than or equal to the historic engagement level, analyzing the one or more related strings of characters to identify engagement factors;
generating an engagement recommendation based on the analyzing and the engagement factors; and
transmitting at least the predicted engagement level and the engagement recommendation to the computing device to cause the computing device to display the predicted engagement level and the engagement recommendation in a selectable field associated with the input field.

2. The method of claim 1, wherein the engagement recommendation comprises suggested engagement factors from the identified engagement factors to increase the predicted engagement level.

3. The method of claim 1, further comprising:
analyzing the one or more related strings of characters to identify hindrance factors; and
generating an engagement recommendation based on the hindrance factors.

4. The method of claim 3, wherein the engagement recommendation comprises suggested hindrance factors from the identified hindrance factors to withhold in order to increase the predicted engagement level.

5. The method of claim 1, wherein analyzing the historical data includes at least one of analyzing semantic and syntactic content, location, date, time, and user tags of the previously received first strings of characters uploaded by the user.

6. The method of claim 1, wherein the data packet further comprises an image, and the method further comprises:
analyzing historical images associated with the user to identify patterns between the image and the historical images;
determining one or more related images from the historical images based on the identified patterns;
determining the historic engagement level for each of the one or more related images;
determining the predicted engagement level for the image based on the historic engagement level; and
transmitting the predicted engagement level to the computing device.

7. The method of claim 1, wherein analyzing the historical data further comprises analyzing historical data of the other users.

8. The method of claim 1, further comprising:
transmitting the historic engagement level for each of the one or more related strings of characters to cause the computing device to display the historic engagement levels.

9. The method of claim 1, wherein the string of characters is a potential post by the user, the potential post having not been submitted by the user.

10. A system having one or more computer processors, the system configured to:
receive a data packet from an input field of a form on a computing device, the data packet comprising a string of characters;
analyze historical data associated with a user to identify patterns between the string of characters and the historical data, the historical data including at least first strings of characters previously received from the user and second strings of characters previously posted by other users;
determine one or more related strings of characters from the historical data based on the identified patterns;
determine a historic engagement level for each of the one or more related strings of characters, the historic engagement level indicating past interests of other users in each of the one or more related strings of characters;
determine a predicted engagement level for the string of characters based on the historic engagement level, the predicted engagement level indicating a predicted user interest;
analyze the historic engagement level and the predicted engagement level to determine whether the predicted engagement level is greater than or equal to the historic engagement level;
in response to determining the predicted engagement level is not greater than or equal to the historic engagement level, analyze the one or more related strings of characters to identify engagement factors;
generate an engagement recommendation based on the analyzing and the engagement factors; and
transmit at least the predicted engagement level and the engagement recommendation to the computing device to cause the computing device to display the predicted engagement level and the engagement recommendation in a selectable field associated with the input field.

11. The system of claim 10, wherein the engagement recommendation comprises suggested engagement factors from the identified engagement factors to increase the predicted engagement level.

12. The system of claim 10, further configured to:
analyze the one or more related strings of characters to identify hindrance factors; and
generate an engagement recommendation based on the hindrance factors.

13. The system of claim 12, wherein the engagement recommendation comprises suggested hindrance factors from the identified hindrance factors to withhold in order to increase the predicted engagement level.

14. The system of claim 10, wherein the data packet further comprises an image, further configured to:
analyze historical images associated with the user to identify patterns between the image and the historical images;
determine one or more related images from the historical images based on the identified patterns;
determine the historic engagement level for each of the one or more related images;
determine the predicted engagement level for the image based on the historic engagement level; and
transmit the predicted engagement level to the computing device.

15. A computer program product comprising a non-transitory computer readable storage medium having program instructions embodied therewith, the program instructions executable by a processor of a first computing device to cause the first computing device to perform a method comprising:
receiving a data packet from an input field of a form on a second computing device, the data packet comprising a string of characters;
analyzing historical data associated with a user to identify patterns between the string of characters and the historical data, the historical data including at least first strings of characters previously received from the user and second strings of characters previously posted by other users;
determining one or more related strings of characters from the historical data based on the identified patterns;
determining a historic engagement level for each of the one or more related strings of characters, the historic engagement level indicating past interests of other users in each of the one or more related strings of characters;
determining a predicted engagement level for the string of characters based on the historic engagement level, the predicted engagement level indicating a predicted user interest;

analyzing the historic engagement level and the predicted engagement level to determine whether the predicted engagement level is greater than or equal to the historic engagement level;

in response to determining the predicted engagement level is not greater than or equal to the historic engagement level, analyzing the one or more related strings of characters to identify engagement factors;

generating an engagement recommendation based on the analyzing and the engagement factors; and transmitting at least the predicted engagement level and the engagement recommendation to the second computing device to cause the second computing device to display the predicted engagement level and the engagement recommendation in a selectable field associated with the input field.

16. The computer program product of claim 15, wherein the engagement recommendation comprises suggested engagement factors from the identified engagement factors to increase the predicted engagement level.

17. The computer program product of claim 15, further comprising:

analyzing the one or more related strings of characters to identify hindrance factors; and generating an engagement recommendation based on the hindrance factors.

* * * * *